United States Patent
Huang et al.

Patent Number: 6,026,406
Date of Patent: Feb. 15, 2000

[54] BATCH PROCESSING OF UPDATES TO INDEXES

[75] Inventors: Wei Huang, Foster City; Gianfranco Putzolu, San Francisco; William H. Waddington, Foster City; Jonathan D. Klein, Pleasanton, all of Calif.

[73] Assignee: Oracle Corporation, Redwood Shores, Calif.

[21] Appl. No.: 08/855,544

[22] Filed: Jun. 4, 1997

[51] Int. Cl.⁷ .................................................... G06F 17/30
[52] U.S. Cl. ............................................. 707/100; 707/7
[58] Field of Search ............................ 707/101, 3, 202, 707/204, 100, 7

[56] References Cited

U.S. PATENT DOCUMENTS

| | | | |
|---|---|---|---|
| 4,933,848 | 6/1990 | Harderle et al. | 364/300 |
| 5,276,872 | 1/1994 | Lomet et al. | 395/600 |
| 5,288,894 | 2/1994 | Deran | 365/600 |
| 5,563,997 | 10/1996 | Fisher | 395/148 |
| 5,717,921 | 2/1998 | Lomet et al. | 395/611 |
| 5,758,356 | 5/1998 | | |
| | | Hara et al. | 707/202 |

OTHER PUBLICATIONS

D. Knuth, *The Art of Computer Programming* vol. 3, "Sorting and Searching," Addison–Wesley Publishing Co., Jan. 1973, ISBN 0–201–03803–X, pp. 158–168; Table of Contents (xii–xiii); Index and Glossary (pp. 757–780).

J. Gray and A. Rueter, *Transaction Processing Concepts and Techniques*, Morgan Kaufman Publishers, Jan. 1993, ISBN–1–55860–190–2; pp. 406–416, Table of Contents (vii–xx); Index (pp. 1047–1070).

*Primary Examiner*—Wayne Amsbury
*Assistant Examiner*—Cheryl Lewis
*Attorney, Agent, or Firm*—Lyon & Lyon LLP

[57] ABSTRACT

A method and apparatus for batch processing of updates to indexes is provided. A plurality of index update records are generated that identify a plurality of index update operations to be made to an index. The plurality of index entry records are sorted and then applied, in an order that corresponds to the sort order, in batches to their respective indexes. As a result of performing batch processing of updates to indexes, the number of disk I/Os will be greatly reduced, freeing database system resources to perform other tasks. The overall efficiency of index maintenance is also improved, as is the recovery of the database system after a failure, resultant from an ordering of the index maintenance operations and a partial ordering of the persistent redo log file.

28 Claims, 8 Drawing Sheets

BATCH PROCESSING OF UPDATES TO INDEXES

FIELD OF THE INVENTION

The present invention relates to database systems, and more specifically to techniques for performing updates to indexes.

BACKGROUND OF THE INVENTION

Figure 1:
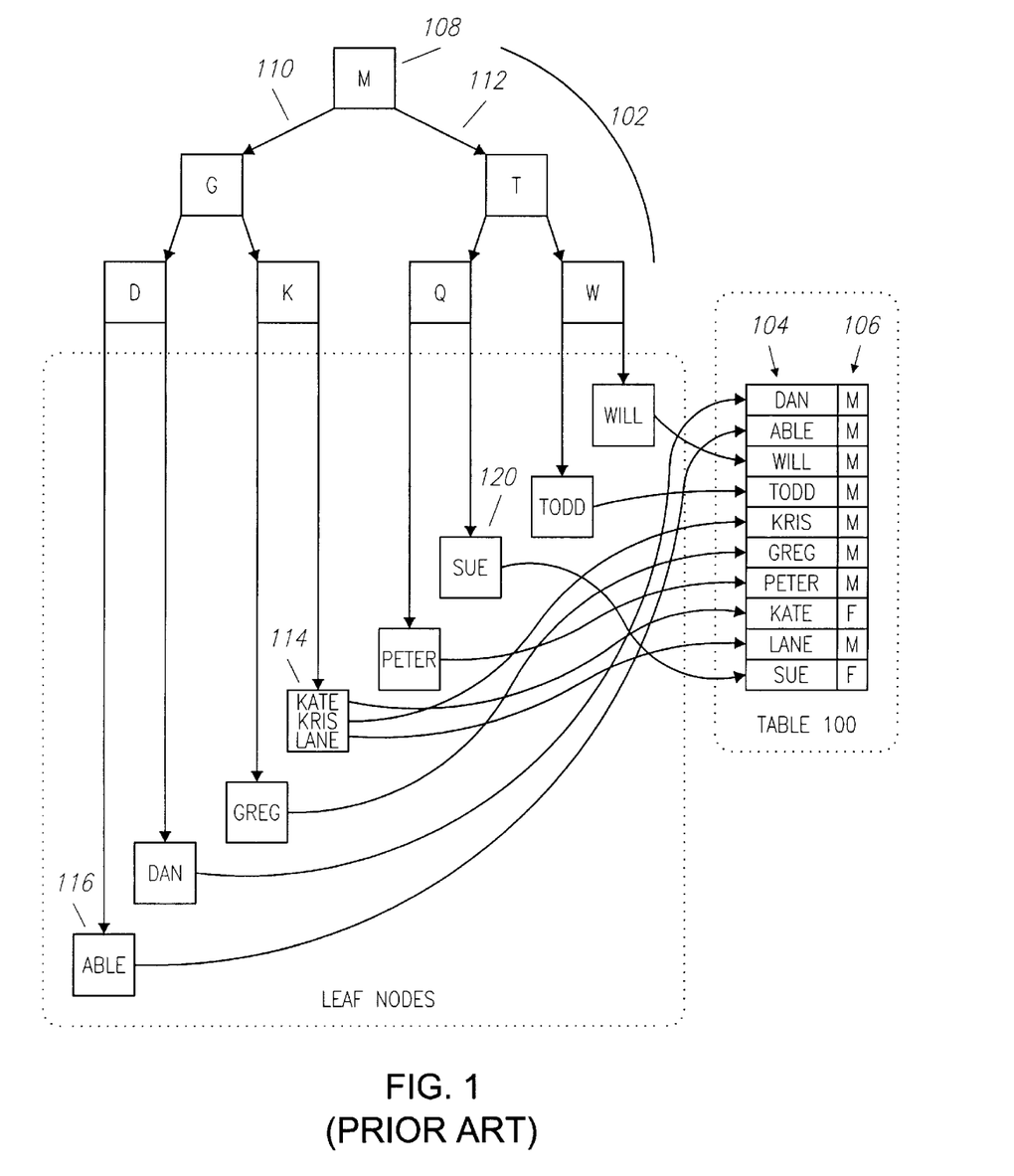
FIG. 1 is a block diagram of a table and an index for the table.

Indexes are data structures that provide relatively fast access to a set of data based on key values. FIG. 1 illustrates an exemplary table 100 with a corresponding B-tree index 102. The table 100 has a name column 104 and a gender column 106. The values in the name column 104 are used as the key of the B-tree index 102. The B-tree index 102 includes branch nodes and leaf nodes.

Branch nodes contain (1) pointers to other nodes and (2) other data that indicates the range of values associated with the nodes to which the pointers point. The range of values associated with a node are referred to herein as "boundary values". For example, node 108 contains pointers 110 and 112. Node 108 also stores the letter "M" to indicate that the boundary values for the names stored in the nodes attached to node 108 begin with the letters "A" through "L" are stored in the nodes attached to pointer 110 while the names that begin with the letters "M" through "Z" are stored in the nodes attached to pointer 112.

The leaf nodes of B-tree index 102 store key values and pointers to the rows of table 100 that correspond to the key values. For example, leaf node 114 contains three entries. The first entry stores the key value "KATE" in the name column and a pointer to the row in table 100 that has the key value "KATE". The second entry of leaf node 114 stores the key value "KRIS" and a pointer to the row in table 100 that has the key value "KRIS". The third entry of leaf node 114 stores the key value "LANE" and a pointer to the row in table 100 that contains the key value "LANE".

As new items are inserted into the base data container (e.g. table 100) associated with index 102, new entries that correspond to the new data items are added to the index 102. For example, if a record where the data for column 1 is "ANGIE" and the data for column 2 is "F" were added to table 100, a corresponding index entry would be added to leaf node 116 of B-tree 102. The new index entry would include the key value "ANGIE" and a pointer to the new row added to table 100.

Figure 2:
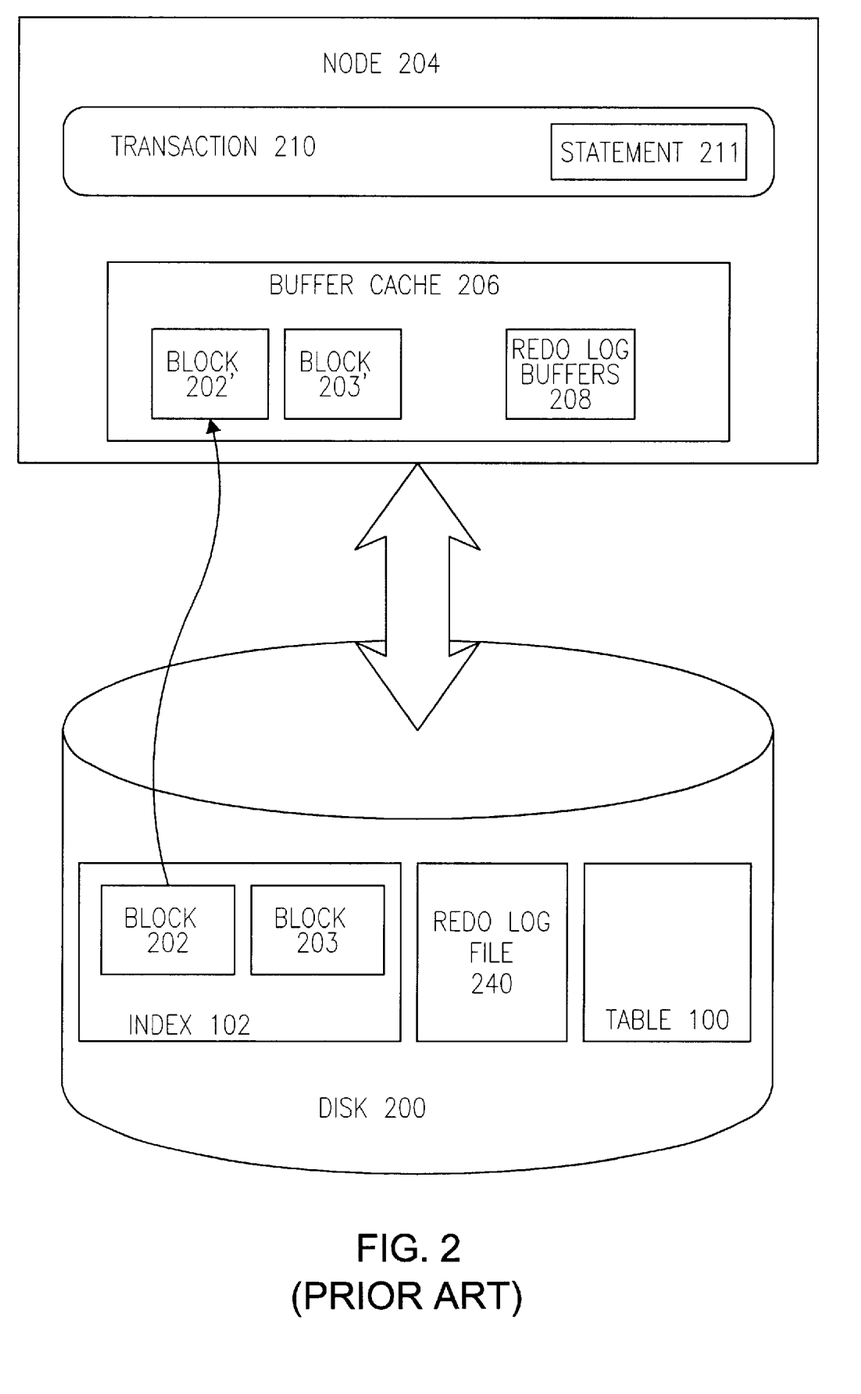
FIG. 2 is a block diagram of a database system.

FIG. 2 illustrates a system that includes a node 204 and a disk 200. Node 204 generally represents one of possibly many processing units that have access to the one or more disks that contain the database in which table 100 is stored. Node 204 may be, for example, a networked workstation or a cluster of processors and memory components within a multi-processing machine.

Log files keep track of changes made to a disk block in a database for purpose of recovery or reconstruction of transactions. A redo log file is one such log file. A redo log file contains redo log records. A redo log record contains information necessary to reconstruct, or redo changes made by operations such as INSERT, DELETE and UPDATE. Redo log records are generated for each change made to a copy of a disk block stored in a buffer cache 206. The redo log records are temporarily stored in a redo log buffer 208. Just before a transaction commits, all of the redo log records in the redo log buffer 208 associated with the transaction are written to a persistent redo log file 240. In this way, if a database system fails, then the database system can reapply the redo log records stored in persistent redo log file 240 to recover changes made by committed transactions before the failure.

Before an entry may be added to an index, the portion of the index into which the entry is to be added is typically loaded into the dynamic memory of the node that is inserting the entry. For example, assume that a statement 211 in a transaction 210 executing in node 204 specifies the insertion of a row containing the data "ANGIE, F" into table 100. Assume also that disk block 202 stores leaf node 116 of a B-tree index 102. To insert the appropriate entry into index 102, disk block 202 is loaded into buffer cache 206 of node 204. In the illustration, the cached copy of the block is shown as 202'.

Once loaded into the buffer cache 206, the copy 202' of disk block 202 is updated with the appropriate index entry for "ANGIE". A redo log record is written to the redo log buffers 208. Once the transaction 210 is complete, the redo log records for each statement in the transaction are written to persistent redo log file 240. After the redo log buffers 208 are written to persistent redo log file 240, the transaction 210 can commit. At any time, the updated copy 202' of disk block 202 may be stored back to disk 200.

Typically, the closer key values are to each other in the order used by the index, the more likely the index entries for the key values will be stored in the same portion of the index. For example, in the B-tree index depicted in FIG. 1, index entries for "KEN", and "KENT" and "KENNETH" would all be stored in leaf node 114. Consequently, there is a high likelihood that index entries for data items with consecutive key values will be stored in the same portion of an index structure.

One approach to performing index maintenance operations is to immediately update the index 102 as each change is applied to a table associated with the index. According to this approach, an update to index 102 is applied immediately after a corresponding row of table 100 is updated. For example, if records "ANGIE, F", "STACEY, F" and "ART, M" are inserted into table 100, index 102 would need to be updated with three separate update operations.

More specifically, after the record "ANGIE, F" is added to table 100, leaf node 116 of index 102 would be updated with an index entry for the new row. Assume that disk block 202 of disk 200, depicted in FIG. 2, contains leaf node 116. To perform the index update, disk block 202 would be copied from disk 200 and copied as disk block 202' in buffer cache 206. An index entry with the key value "ANGIE" and a pointer to the corresponding row "ANGIE, F" in table 100 would be inserted into disk block 202', and a redo log record would be added to the redo log buffers 208 to record the change made to disk block 202.

Next, the record "STACEY, F" would be inserted into table 100 and index 102 would again be updated. Assume now that disk block 203 of disk 200, depicted in FIG. 2, contains leaf node 120. To perform the index update, disk block 203 would be copied from disk 200 and written as disk block 203' in buffer cache 206. An index entry with the key value "STACEY" and a pointer to the corresponding row "STACEY, F" in table 100 would inserted into disk block 203, and a redo log record would be added to the redo log buffers 208 to record the change made to disk block 203.

Finally record "ART, M" would be inserted into table 100 and index 102 would again be updated. As mentioned above, disk block 202, depicted in FIG. 2, contains leaf node 116. If the disk block 202 had been written back to disk 200 subsequent to the insertion of the index entry for ANGIE, then disk block 202 would have to again be copied from disk 200 and written as disk block 202' in buffer cache 206. Key value "ART" and a pointer to the corresponding row "ART, M" in table 100 would be inserted into leaf node 116 of index 102 and another redo log record would be added to the redo log buffers 208 to record the change made to disk block 202. At any point during or after the index update operation, the redo log records within redo log buffers 208 could be written to the persistent redo log file 240 in disk 200.

The per-update approach to performing index maintenance described above is expensive because the overhead is high. There is a significant amount of I/O as a result of copying the disk block from disk 200 to buffer cache 206 and then from buffer cache 206 back to disk 200. There is also a significant amount of instruction cycles associated with the per-update approach to index maintenance. In the event of a system failure or rolling forward an operation, the haphazard arrangement of the redo log records of the redo log file 240 further exacerbates the I/O problem and ties up system resources.

In general, the number of rows updated by a given statement 211 that references a table increases as the size of the table increases. The larger the number of rows that are updated, the greater the overhead associated with updating indexes and generating and storing the redo log records for the updates to the indexes. Clearly, if a large number of updates to an index were to be made in a relatively short amount of time, the per-update approach can be particularly inefficient: the same disk blocks may be repeatedly swapped back and forth between the buffer cache 206 and disk 200. Further, the more frequently that disk blocks, such as 202 or 203, are updated, the more redo log records will be created. Many of the redo log records may represent changes to the same disk block. Each of these events cause a considerable amount of I/O and a drain on system resources. Thus, there is a need for a more efficient method for updating indexes in a database system.

SUMMARY OF THE INVENTION

A method and apparatus for batch processing of updates to indexes is provided. According to the method, a plurality of index update records are generated that identify a plurality of index update operations to be made to an index. The plurality of index update records are then sorted. Later, the plurality of index update records are applied, in an order that corresponds to their sort order, in batches to their respective indexes.

As a result of sorting the plurality of index update records, the number of disk I/Os incurred during the index updates is reduced, thus freeing database system resources to perform other tasks. Also, the number of instruction cycles associated with index maintenance is reduced. Hence, the overall efficiency of index maintenance and the recovery of the database system after a failure are improved.

According to another aspect of the invention, when a batch of index update records is applied to an index, an index update record is fetched and an index tree is traversed (based on the key value associated with the index entry record) until a target leaf node is found. For the next index update records fetched from the batch, an immediate check is made to verify whether the next index update record falls within the boundary values associated with the target leaf node. If the next index update record does fall within the boundary values, then a subsequent index tree traversal may be skipped. Each index update record is additionally tested to verify if it can be applied to the target leaf node. If the index update record can be applied to the target leaf node, then it is applied. When an index update record is encountered that cannot be applied to the target leaf node (either because it will not fit or because the key value falls outside the range associated with the leaf node), the traversal process is repeated.

In one embodiment of the invention, a single redo log record is generated to describe a plurality of index update records applied to a single leaf node. As a result, the recovery of the database system after a failure is further improved.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for batch processing of updates to indexes is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 3:
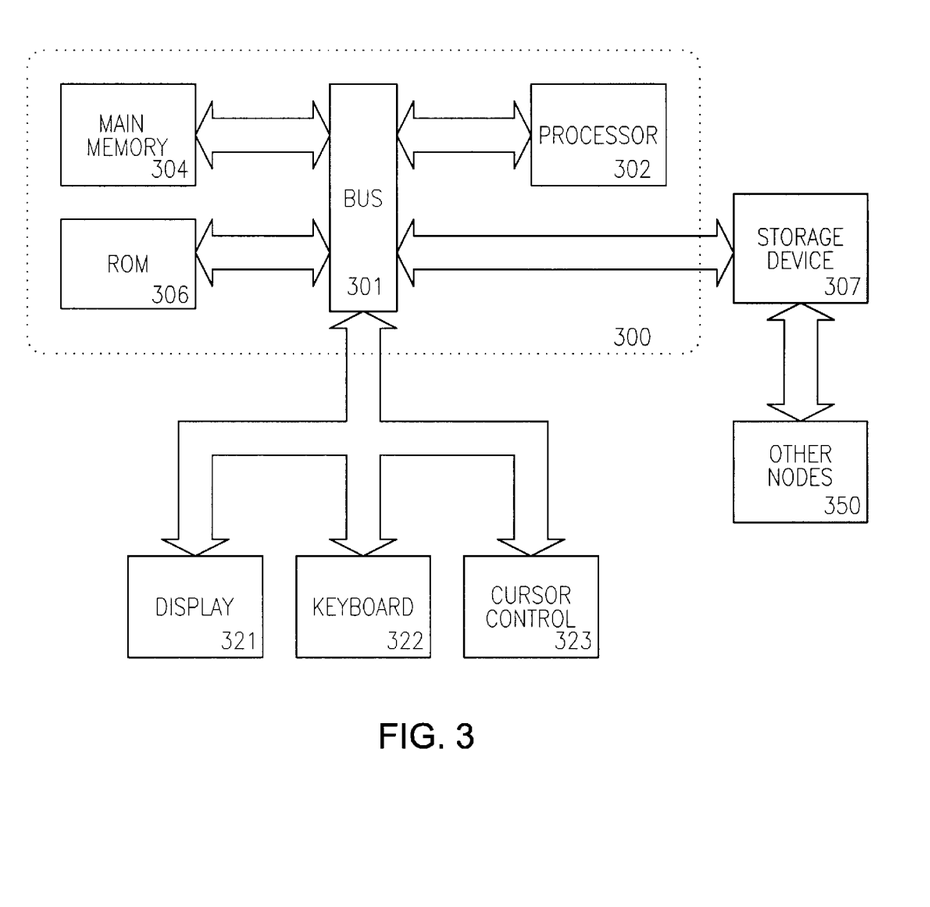
FIG. 3 is a block diagram of a computer system that may be used to implement an embodiment of the invention.

Referring to FIG. 3, it is a block diagram of a computer system 300 upon which an embodiment of the present invention can be implemented. Computer system 300 includes a bus 301 or other communication mechanism for communicating information, and a processor 302 coupled with bus 301 for processing information. Computer system 300 further comprises a random access memory (RAM) or other dynamic storage device 304 (referred to as main memory), coupled to bus 301 for storing information and instructions to be executed by processor 302. Main memory 304 also may be used for storing temporary variables or other intermediate information during execution of instructions by processor 302. Computer system 300 also comprises a read only memory (ROM) and/or other static storage device 306 coupled to bus 301 for storing static information and instructions for processor 302. Data storage device 307 is coupled to bus 301 for storing information and instructions.

A data storage device 307 such as a magnetic disk or optical disk and its corresponding disk drive can be coupled to computer system 300. Computer system 300 can also be coupled via bus 301 to a display device 321, such as a cathode ray tube (CRT), for displaying information to a computer user. Computer system 300 further includes a keyboard 322 and a cursor control 323, such as a mouse.

The present invention is related to the use of computer system 300 to perform batch processing of updates to indexes. According to one embodiment, batch processing of updates to indexes is performed by computer system 300 in response to processor 302 executing sequences of instructions contained in memory 304. Such instructions may be read into memory 304 from another computer-readable medium, such as data storage device 307. Execution of the sequences of instructions contained in memory 304 causes processor 302 to perform the process steps that will be described hereafter. In alternative embodiments, hard-wired circuitry may be used in place of or in combination with software instructions to implement the present invention. Thus, the present invention is not limited to any specific combination of hardware circuitry and software.

Creating Batches of Index Update Records

Figure 4:
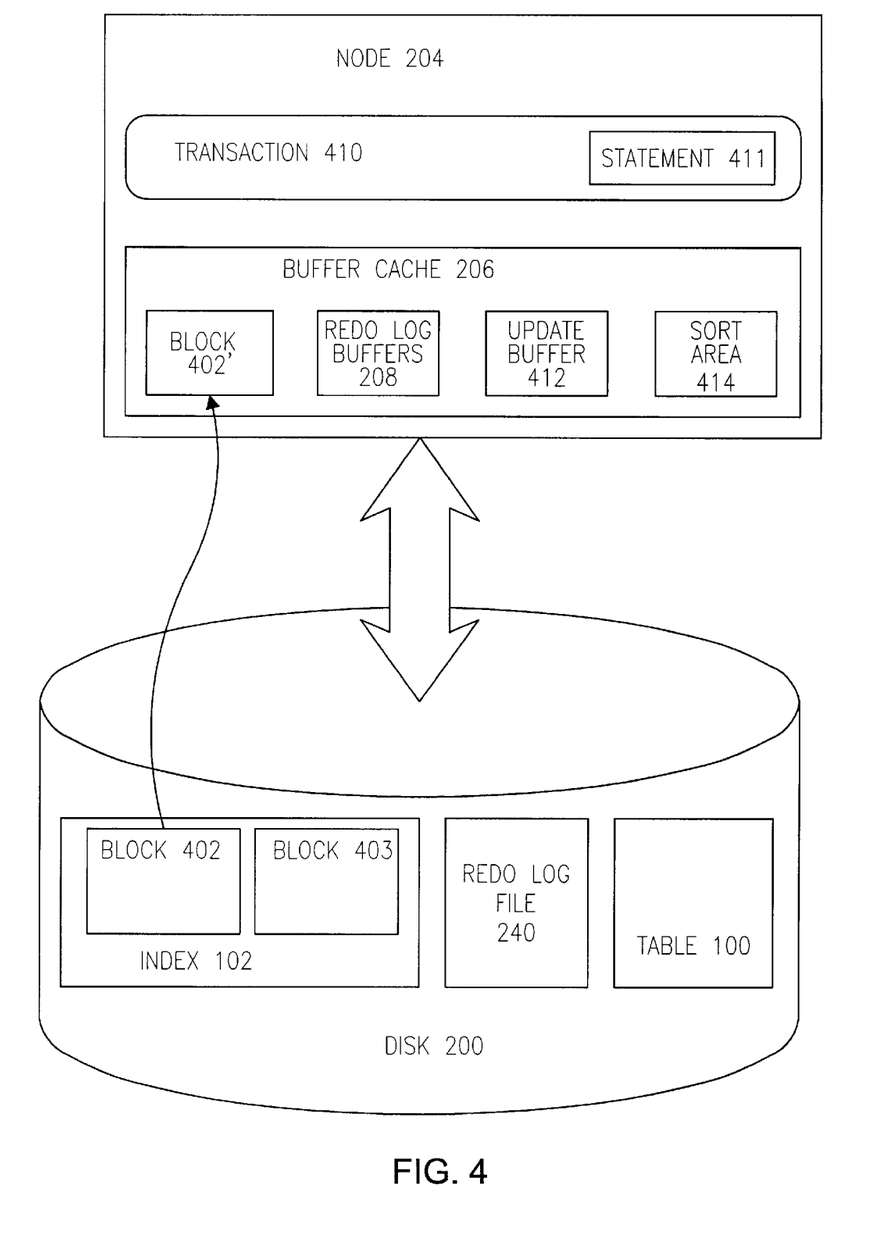
FIG. 4 is a block diagram of a database system configured to perform index updates according to an embodiment of the invention.

Referring to FIG. 4, it illustrates a database system configured to perform index updates according to an embodiment of the invention. During a transaction 410, a statement 411 may be executed which specifies a plurality of updates (e.g., DELETE, INSERT, or UPDATE) to a subset of records in a table 100. Many of the updates to the table 100 will also involve updates to its corresponding index 102. For example, the insert of rows into table 100 will necessitate the insertion of index entries in index 102. Conversely, the deletion of rows from table 100 will necessitate the deletion of index entries from index 102. For the purpose of explanation, table 100 and index 102 depicted in FIG. 4 shall refer to the corresponding table 100 and index 102 elements depicted in FIG. 1.

According to one embodiment of the invention, for each index update required, an index update record is generated. The index update record is a record containing, information that indicates a type of index update operation to be performed (such as, but not limited to, INSERT and DELETE), a key value and a pointer to a row in the table 100 that corresponds to the key value.

Figure 5:
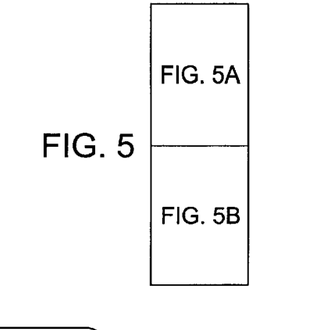
FIG. 5 is a flowchart illustrating the steps of creating batches of index update records according to the preferred embodiment.
Figure 5A:
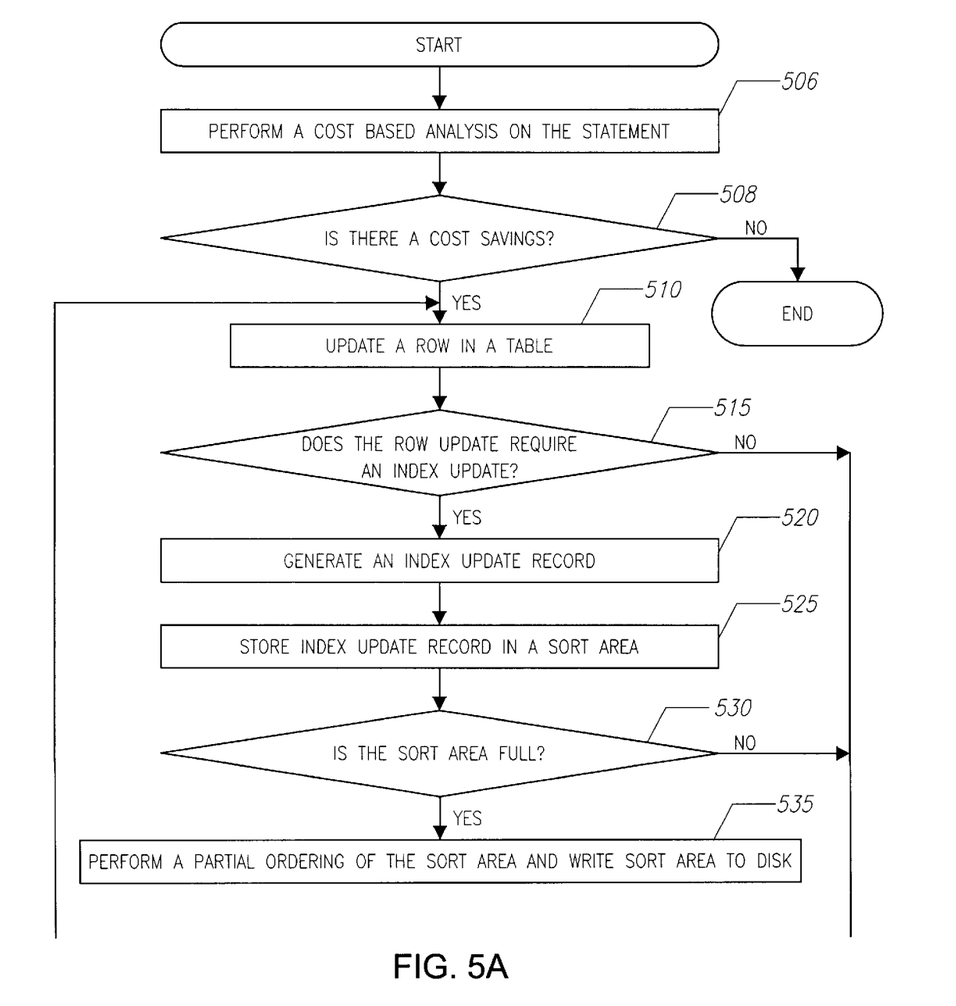
Figure 5B:
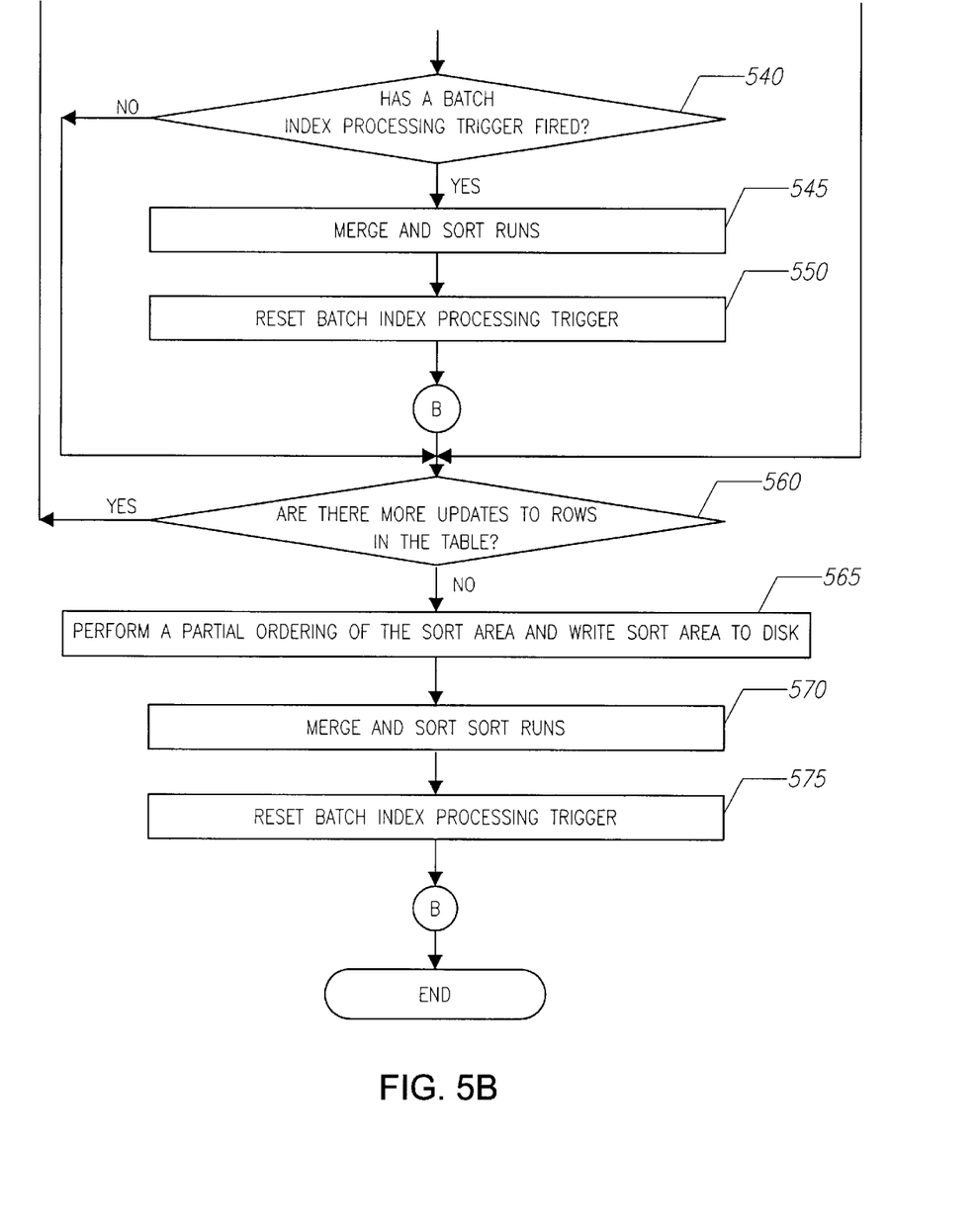

FIG. 5 depicts a series of steps for creating batches of index update records in one embodiment of the present invention. In step 506, a cost based analysis is performed upon the statement 411. The cost based analysis produces an anticipated system cost associated with the statement 411. Anticipated system cost generally reflects the amount database system resources to be consumed if the statement 411 is executed. Some of the user-defined parameters that may be used to estimate this cost include a transfer rate, an update size, an I/O latency and a fixed overhead.

In one embodiment, the cost based analysis determines the I/O costs associated with the statement 411. An example of a function for calculating the I/O cost of the statement 411 is:

I/O Cost=Number of Updates(Transfer Rate/Update Size+I/O Latency)+Overhead where the number of updates is determined by the number of updates in the statement 411. In general, batch processing of updated to indexes provides a cost savings if the savings from the reduction of the number of disk blocks updated is greater than the additional cost of a sort. Other methods for performing a cost based analysis can be employed to produce a similar result.

An alternative embodiment comprises a method and mechanism whereby the cost based analysis is not performed. Instead, steps 506 and 510 are not performed and the update process begins at step 510.

In step 508, the I/O cost determined in step 506 is compared with a user defined cost threshold value to determine whether to perform batch processing of updates to indexes. If the cost associated with the statement 411, based upon the user defined set of parameters, would be less by performing, batch processing of updates to an index than the cost associated with the user defined cost threshold value, then the process continues to step 510. If the I/O cost associated with the statement 411 would not be less by performing batch processing of updates to indexes then batch processing of updates to an index is not performed and an alternative method for performing index maintenance operations, such as the per-update approach to performing index maintenance operations, is performed.

In step 510, an update to a row in the table 100 is performed. After the update to the row in the table 100 is performed, the next step, step 515, is to test the update to the row to determine whether an index update is required. If an index update is required then an index update record is generated at step 520. If, in step 515, the update to the row does not require an index update, then the process continues to step 560. Step 560 will be explained in further detail below.

Each index update record generated at step 520 is thereafter stored in a sort area 414 of buffer cache 206 (step 525). Table 1 shows a representative group of index update records stored in the sort area 414 according to one embodiment of the invention. The first column of Table 1 represents an index update operation type, the second column represents a key value and the third column stores a pointer to the corresponding row of the table 100.

TABLE 1

| INSERT | ANGIE | POINTER A |
| INSERT | SUE   | POINTER B |
| INSERT | ART   | POINTER C |
| INSERT | SARAH | POINTER D |

In step 530, the sort area 414 is tested to determine whether it is full. If the sort area 414 is full, then, in step 535, a partial ordering of the sort area by update operation type and then key value is performed and the sort area 414 is written to disk 200 as a sort run. If the sort area is not full at step 530, then the process continues to step 560.

An index update condition is any condition which triggers an application to an index 102 of the index update operations described by a batch of index update records, and may include, for example, 1) the completion of the table updates for a statement 411, or 2) the firing of a batch processing trigger. A batch index processing trigger may be set to fire, for example, after the number of index update records reaches a threshold value. The threshold value may be either a user defined value, or a dynamically generated value based upon a cost based analysis of a statement 411, or a combination of the user defined value and the dynamically generated value.

After step 535, a test is made at step 540 to determine whether a batch index processing trigger has fired. If a batch index processing trigger has not been fired, then the process continues to step 560, described below.

If a batch index processing trigger has been fired, then the sort runs are merged from the disk 200 and the sort area 414 into the buffer cache 206 and then sorted in step 545. There are numerous merging and sorting techniques well known in the art. Methods for merging and sorting data are disclosed in *Sorting and Searching,* D. Knuth, Addison-Wesley Publishing Co., 1973, ISBN 0-201-03803-X, which is incorporated herein by reference. In one embodiment, an external merge sort described by Knuth is used to merge and sort the index update records from disk 200 and sort area 414(step 545).

In the preferred embodiment, the final ordering of the index update records, after merging and sorting in step 545, creates a batch of index update records for each index update operation type, wherein each batch of index update records is further sorted by key value.

In an alternative embodiment, step 545 comprises merging and sorting the index update records by key value without respect to the type of operation specified in the index update records. In another alternative embodiment, step 545 comprises merging and sorting the index update records first by key value, and then further sorting the records that have similar key values by index update operation type so that DELETE operations are performed first, followed by INSERT operations.

Table 2 illustrates one batch, or set, of index update records resultant from merging, and sorting the sort runs in step 545.

TABLE 2

| INSERT | ANGIE | POINTER A |
|--------|-------|-----------|
| INSERT | ART   | POINTER C |
| INSERT | SARAH | POINTER D |
| INSERT | SUE   | POINTER B |

In step 550, the batch index processing trigger is reset. In one embodiment, the batches of index update records resultant from merging and sorting in step 545 are then applied to index 102 based on the flow charts depicted in FIG. 6 and FIG. 7. In an alternative embodiment, the sorted batches of index updates in buffer cache 206 are applied to index 102 in a method similar to the per-update approach.

In step 560, statement 411 is tested for additional row updates. If there are more row updates to be performed based on statement 411, then the process returns to step 510 described above. If there are no more row updates to be performed based on statement 411, then the process continues to step 565.

In step 565, a partial ordering of the sort area by update operation type and then key value is performed and the sort area 414 is written to disk 200 as a sort run. Next, in step 570, the sort runs are merged from the disk 200 and the sort area 414 into the buffer cache 206 and then sorted. Finally, the batch index processing trigger is reset in step 575.

Accordingly, if the index update records are sorted by key value, then a cost savings is realized because disk blocks (such as 402 and 403) are not redundantly swapped to and from disk 200 and buffer cache 206.

Applying Batches of Index Records

Figure 6:
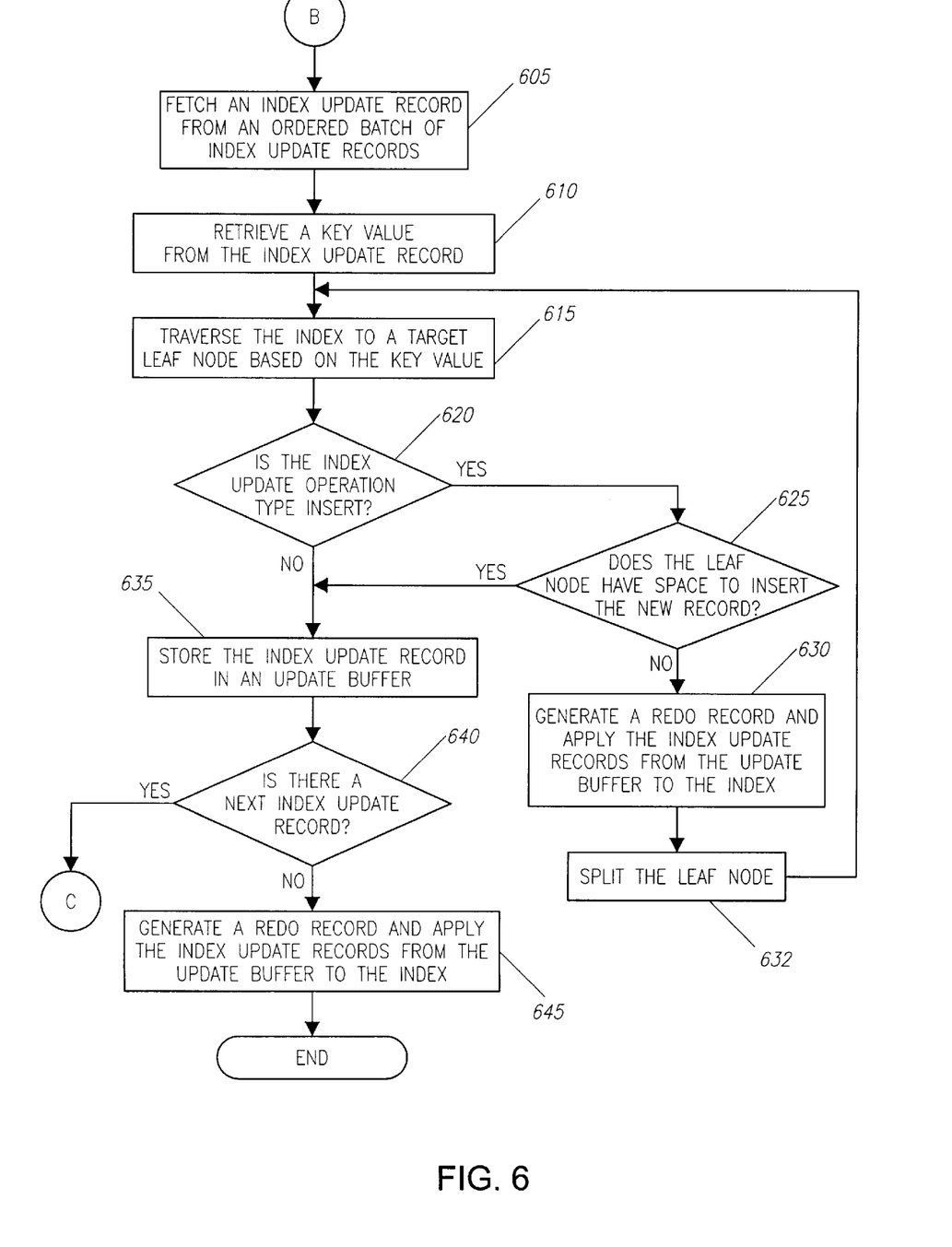
FIG. 6 and FIG. 7 are flowcharts illustrating the steps of applying a batch of index update records to a B-tree index according to the preferred embodiment of the invention.
Figure 7:
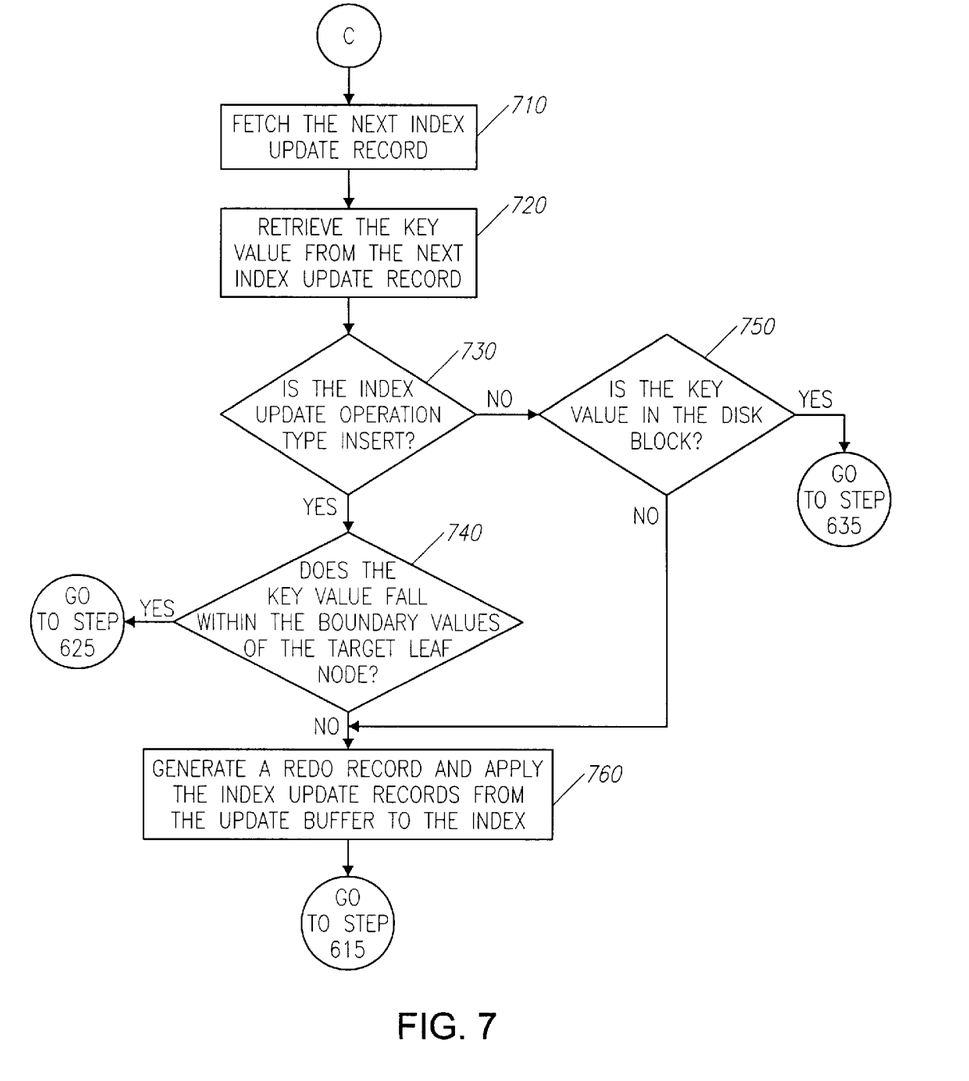

FIG. 6 and FIG. 7 are flow charts depicting a series of steps for applying batches of index update records to an index 102 in one embodiment of the present invention.

In step 605, an index update record from an ordered batch of index update records in buffer cache 206 is fetched. At step 610, a key value is retrieved from the index update record that was fetched in step 605. In step 615, the nodes of index 102 are traversed based on the retrieved key value to locate a target leaf node, such as leaf node 114 or 116. A target leaf node is the leaf node associated with the boundary values that define the range into which the retrieved key value fits. Because of the logical structure of a B-tree index 102, any given key value (assuming that the pointer is made a part of the key value when non-unique key values are present) will only have one target leaf node in the index 102.

In step 620, the index update record is tested to determine whether the index update operation type is INSERT. If the index update record operation type is not INSERT, then the index update record is stored in an update buffer 412 in buffer cache 206 in step 635. (Note that it is assumed that update buffer 412 is the approximate size of a disk block.)

For index update records where the operation type is INSERT, the target leaf node is tested in step 625 to verify that there is sufficient space to insert entries into the leaf node from the index update record and from any additional index update records currently stored in the update buffer 412.

If there is insufficient space, then, in step 630, a single redo log record is generated for the index update records in the update buffer 412 and the index update records are applied to index 102 from index update buffer 412. Next, the leaf node is split at step 632, meaning the leaf node is broken into two leaf nodes. After the leaf node is split in step 632, the index 102 is again traversed based on the key value as described above in step 615.

If there is space to insert an index record in step 625, then the index update record is stored in the update buffer 412 in step 635.

In an alternative embodiment, the fetched index update record is not stored in the update buffer 412 in step 635. Instead, a redo log record is generated for the index update record and the index update record is applied to index 102. (Note that steps 630, 645 and 760 are not necessary when the index update records are not stored to an update buffer 412 or its equivalent.)

After storing the index entry update in the update buffer 412 in step 635, the merged and sorted batches of index update records in buffer cache 206 are tested at step 640 to determine whether there are more index update records. If there is a next index update record, then the method continues to step 710 depicted in the flow chart of FIG. 7. If there are no more index update records, then a single redo log record is generated for the index update records in the update buffer 412 and the index update records are applied to index 102 from index update buffer 412 in step 645. Finally, the process ends.

In step 710, the next index update record is fetched. At step 720, a key value is retrieved from the next index update record. In step 730, the next index update record is tested to determine whether the index update operation type is INSERT. If the index update operation type is INSERT, then the key value is tested, in step 740, to determine whether it falls within the boundary values of the target leaf node. If, in step 740, the key value does not fall within the boundary values of the target leaf node, then the method continues to step 760, which will be explained in further detail below. If, in step 740, the key value does fall within the boundary values of the target leaf node, then the method continues to step 625 (shown in FIG. 6).

If, as a result of testing in step 730, the index update operation type is not INSERT, then, in step 750, the key value is tested to determine whether it is in the disk block 402' loaded into buffer cache 206. If the key value is in the disk block 402', then the method continues to step 635 (shown in FIG. 6). If the key value is not in the disk block 402', then the method continues to step 760.

In step 760, a single redo log record is generated for the index update records in the update buffer 412 and the index update records are applied to index 102 from index update buffer 412. The method continues to step 615 depicted in FIG. 6 and explained above.

Accordingly, if a next fetched key value from step 710 does fit within the boundary values of the current target leaf node, then a further cost savings is realized because the index 102 does not need to be redundantly traversed, resulting in fewer instruction cycles.

According to one embodiment of the invention, a single redo log record is generated to describe a plurality of index update records applied to a leaf node. For example, Table 2 illustrates that, after sorting, the index update record to insert ART immediately follows the index update record to insert ANGIE. Both ANGIE and ART fall into range associated with leaf node 116. Consequently, both ANGIE and ART are inserted into the disk block that stores leaf node 116, and a single redo log record is generated to describe both updates. The same is true of the index update records to insert SARAH and SUE into leaf node 120; both updates will be reflected in a single redo log record describing the changes made to leaf node 120.

Thus, according to one embodiment of the invention, by sorting the index update records and applying them in batches based upon their relative location in index 102, there will be fewer redo log records generated for the same number of index entry updates. Because the redo log records in redo log file 240 are in ordered batches, there will be less swapping between disk 200 and buffer cache 206 when the redo log records of redo log file 240 are applied to the database in the event of a system failure.

Referring again to the example of Table 2, assume the index update records shown in the table need to be applied to the index 102. The first index update record, "INSERT, ANGIE, POINTER A", is fetched in step 605 and the key value "ANGIE" is retrieved in step 610. The index 102 is traversed in step 615 until a target leaf node 116 is found. In step 620, the index update operation type is tested. Since the index update operation type is "INSERT", the target leaf node 116 is tested for available space in step 625. There is available space, so the index update record, "INSERT, ANGIE, POINTER A" is stored in update buffer 412 in step 635. Next, a test is performed on the merged and sorted batch of index update records (represented by Table 2), in step 640, to determine if there is a next index update record.

As a result of testing in step 640, there is found a next index update record, so the next index update record, "INSERT, ART, POINTER C", is fetched in step 710 and the key value "ART" is retrieved in step 720. The index update operation type is tested in step 730. Since the index update operation type is "INSERT", key value "ART" is then tested in step 740 against the boundary values of the current leaf node 116. The key value falls within the boundary values of the current leaf node 116 so leaf node 116 is additionally tested for available space in step 625. Testing leaf node 116 confirms there is available space, so the index update record "INSERT, ART, POINTER C" is stored in the update buffer 412 in step 635. Next, in step 640, a test is performed on the merged and sorted batch of index update records to determine if there is a next index update record.

As a result of testing in step 640, there is found a next index update record, so the next index update record, "INSERT, SARAH, POINTER D", is fetched in step 710 and the key value "SARAH" is retrieved in step 720. The index update operation type is tested in step 730. Since the index update operation type is "INSERT", key value "SARAH" is then tested in step 740 against the boundary values of the current leaf node 116. The key value does not falls within the boundary values of the current leaf node 116, so a single redo log record is generated for the index update records stored in update buffer 412 and the index update records in update buffer 412 are applied to index 102 in step 760. A consequence of applying the index update records stored in update buffer 412 to the index 102 is that the index update records applied to the index 102 are flushed from the update buffer 412.

Next, index 102 is traversed in step 615 until a target leaf node 120 is found. In step 620, the index update operation type is tested. Since the index update operation type is "INSERT", the target leaf node 120 is tested for available space in step 625. There is available space, so the index update record, "INSERT, SARAH, POINTER D" is stored in update buffer 412 in step 635. Next, in step 640, a test is performed on the merged and sorted batch of index update records to determine if there is a next index update record.

As a result of testing in step 640, there is found a next index update record, so the next index update record, "INSERT, SUE, POINTER B", is fetched in step 710 and the key value "SUE" is retrieved in step 720. The index update operation type is tested in step 730. Since the index update operation type is "INSERT", key value "SUE" is then tested in step 740 against the boundary values of the current leaf node 120. The key value falls within the boundary values of the current leaf node 120, so leaf node 120 is additionally tested for available space in step 625. Testing leaf node 116 confirms there is available space, so the index update record "INSERT, SUE, POINTER B" is stored in the update buffer 412. Next, a test is performed on the merged and sorted batch of index update records, in step 640, to determine if there is a next index update record.

As a result of testing in step 640, a next index update record is not found, so a redo log record describing the index update records in update buffer 412 is generated and the two index update records stored in update buffer 412 are applied to index 102 in step 645. Finally, the process ends.

Locking

A lock manager is a mechanism that grants permission for a transaction 410 to access shared resources within a database system. A lock manager assists in maintaining database consistency and integrity while a database maintenance operation is being performed by ensuring that other concurrently scheduled transactions do not modify a particular portion of the database presently locked by another transaction before the transaction commits. A lock manager is particularly useful when traversing a node in a B-tree index and performing the index update operations because it ensures that another concurrently scheduled transaction does not modify the B-tree index while an index update operation is executing. In this way, multiple index update records can be applied to a target leaf node without re-traversing the index 102. In one embodiment of the invention, a lock manager reduces the number of cache buffer locks acquired to protect the integrity of the index 102, hence, there is the potential of increased concurrency in the database system.

An embodiment of the present invention uses a lock manager to manage access to shared resources during batch processing of updates to indexes. Lock managers are well known in the art. Methods and protocols for implementing the lock manager include: a strict 2-phase locking, a standard 2-phase locking, a B-tree locking and a multiple granularity locking. A B-tree lock protocol is employed by the preferred embodiment described herein. Methods and protocols for implementing lock managers, including the B-tree lock, are described in *Transaction Processing: Concepts and Techniques*, J. Gray and A. Reuter, Morgan Kaufman Publishers, 1993, ISBN 1-55860-190-2 which is incorporated herein by reference.

In the foregoing specification, the invention has been described with reference to specific embodiments thereof. It will, however, be evident that various modifications and changes may be made thereto without departing from the broader spirit and scope of the invention. For example, although the description of the preferred embodiment is directed to the batch processing of updated to a B-tree index, it will be evident that the disclosed invention can be equally applied to other types of indexes. The specification and drawings are, accordingly, to be regarded in an illustrative rather than a restrictive sense.

What is claimed is:

1. A method for batch processing of updates to an index, the method comprising the steps of:

generating a plurality of index update records that identify a plurality of index update operations to be made to said index;

sorting said plurality of index update records; and applying said plurality of index update operations to said index in an order that corresponds to the order of said sorted plurality of index update record, said index update operations being applied in batches of two or more index update operations.

2. The method of claim 1, wherein said index is a B-tree, and wherein said step of applying said plurality of index update operations to said index further comprises the steps of:

fetching an index update record from said sorted plurality of index update records;

retrieving a key value from said index update record;

traversing said B-tree based on said key value to find a target leaf node;

storing said index update record in an update buffer; and performing an index update operation based on said target leaf node and said index update record in said update buffer.

3. The method of claim 2, wherein said method further comprises the steps of:

fetching a next index update record;

retrieving a next key value from said next index update record;

comparing said next key value with a plurality of boundary values associated with said target leaf node;

if said next key value does not fall within said plurality of boundary values, then traversing said B-tree based on said next key value; and if said next key value does fall within said target leaf node, then storing said next index update record in said update buffer.

4. The method of claim 2, wherein said method further comprises the steps of:

testing said target leaf node for available storage space;

if there is not enough storage space in said target leaf node to perform said index update operation, then splitting said target leaf node to create a new leaf node; and if there is enough room in said target leaf node to perform said index update operation, then storing said index update record in said update buffer.

5. The method of claim 2, wherein the method further comprises the step of creating a single redo log record for said plurality of index update operations applied from said update buffer.

6. The method of claim 1, wherein said index is a B-tree, and wherein said step of applying said plurality of index update operations to said index further comprises the steps of:

fetching an index update record from said sorted plurality of index update records;

retrieving a key value from said index update record;

traversing said B-tree based on said key value to find a target leaf node; and performing an index update operation based on said target leaf node and said index update record.

7. The method of claim 6, wherein said method further comprises the steps of:

fetching, a next index update record;

retrieving a next key value from said next index update record;

comparing said next key value with a plurality of boundary values associated with said target leaf node;

if said next key value does not fall within said plurality of boundary values, then traversing said B-tree based on said next key value; and if said next key value does fall within said target leaf node, then performing a next index update operation based on said next index update record.

8. The method of claim 6, wherein said method further comprises the steps of:

testing said target leaf node for available storage space;

if there is not enough storage space in said target leaf node to perform said index update operation, then splitting said target leaf node to create a new leaf node; and if there is enough room in said target leaf node to perform said index update operation, then performing said index update operation based on said index update record.

9. The method of claim 1, wherein said step of sorting further comprises the step of sorting said plurality of index update records by a type of index update operation to be performed.

10. The method of claim 1, wherein said step of sorting further comprises the step of sorting said plurality of index update records by a key value.

11. The method of claim 1, wherein the method further comprises the step of creating a single redo log record for said plurality of-index update operations applied to said index.

12. The method of claim 1, wherein the method further comprises the step of performing a cost based analysis to determine whether to perform batch processing of updates to indexes.

13. A computer readable medium having stored thereon sequences of instructions for batch processing of updates to an index, said sequences of instructions including instructions for performing the steps of:

generating a plurality of index update records that identify a plurality of index update operations to be made to said index;

sorting said plurality of index update records; and applying said plurality of index update operations to said index in an order that corresponds to the order of said sorted plurality of index update records, said index update operations being performed in batches of two or more index update operations.

14. The computer readable medium of claim 13, wherein said index is a B-tree, and wherein said step of applying said plurality of index update operations to said index further comprises the steps of:

fetching an index update record; from said sorted plurality of index update records;

retrieving a key value from said index update record;

traversing said B-tree based on said key value to find a target leaf node;

storing said index update record in an update buffer; and performing an index update operation based on said target leaf node and said index update record in said update buffer.

15. The computer readable medium of claim 14, wherein said method further comprises the steps of:

fetching a next index update record;

retrieving a next key value from said next index update record;

comparing said next key value with a plurality of boundary values associated with said target leaf node;

if said next key value does not fall within said plurality of boundary values, then traversing said B-tree based on said next key value; and if said next key value does fall within said target leaf node, then storing said next index update record in said update buffer.

16. The computer readable medium of claim 14, wherein said method further comprises the steps of:

testing said target leaf node for available storage space;

if there is not enough storage space in said target leaf node to perform said index update operation, then splitting said target leaf node to create a new leaf node; and if there is enough room in said target leaf node to perform said index update operation, then storing said index update record in said update buffer.

17. The computer readable medium of claim 14, wherein the method further comprises the step of creating a single redo log record for said plurality of index update operations applied from said update buffer.

18. The computer readable medium of claim 13, wherein said index is a B-tree, and wherein said step of applying said plurality of index update operations to said index further comprises the steps of:

fetching an index update record from said sorted plurality of index update records;

retrieving a key value from said index update record;

traversing said B-tree based on said key value to find a target leaf node; and performing an index update operation based on said index update record.

19. The computer readable medium of claim 18 wherein said method further comprises the steps of:

fetching a next index update record;

retrieving a next key value from said next index update record;

comparing said next key value with a plurality of boundary values associated with said target leaf node;

if said next key value does not fall within said plurality of boundary values, then traversing said B-tree based on said next key value; and if said next key value does fall within said target leaf node, then performing a next index update operation based on said next index update record.

20. The computer readable medium of claim 18, wherein said method further comprises the steps of:

testing said target leaf node for available storage space;

if there is not enough storage space in said target leaf node to perform said index update operation, then splitting said target leaf node to create a new leaf node; and if there is enough room in said target leaf node to perform said index update operation, then performing said index update operation based on said index update record.

21. The computer readable medium of claim 13, wherein said step of sorting further comprises the step of sorting said plurality of index update records by a type of index update operation to be performed.

22. The computer readable medium of claim 13, wherein said step of sorting further comprises the step of sorting said plurality of index update records by a key value.

23. The computer readable medium of claim 13, wherein said method further comprises the step of creating a single redo log record for said plurality of index update operations applied to said index.

24. The computer readable medium of claim 13, wherein said method further comprises the step of performing a cost based analysis to determine whether to perform batch processing of updates to indexes.

25. A method for batch processing of updates to an index, the method comprising the steps of:

fetching an index update record from a sorted plurality of index update records;

retrieving a key value from said index update record;

traversing said index base upon said key value to a target leaf node, said key value being a value between two boundary values of said target leaf node;

fetching a next index update record from said sorted plurality of index update records;

retrieving a next key value from said next index update record;

comparing said next key value to said two boundary values of said target leaf node;

if said next key value does fall within said two boundary values, then repeating said step of fetching a next index update record; and if said next key value does not fall within said two boundary values, then applying a plurality of index update operations corresponding to two or more fetched index update records falling within said boundary values, and re-traversing said index based upon said next key value not falling within said two boundary values.

26. The method of claim 25, further comprising the steps of;

storing two or more of said sorted plurality of index update records in an update buffer;

performing said plurality of index update operations from said two or more index update records stored in said update buffer to said index;

generating a single redo log record to describe said plurality of index update operations performed from said update buffer to said index.

27. A computer readable medium having stored thereon sequences of instructions for batch processing of updates to an index, said sequence of instructions including instructions for performing the steps of:

fetching an index update record from a sorted plurality of index update records;

retrieving a key value form said index update record;

transversing said index based upon said key value to a target leaf node, said key value being a value between two boundary values of said target leaf node;

fetching a next index update record from said sorted plurality of index update records;

retrieving a next key value from said next index update record;

comparing said next key value to said two boundary values of said target leaf node;

if said next key value does fall within said boundary values, then repeating said step of fetching a next index update record; and if said next key value does not fall within said two boundary values, then performing a plurality of index update operations corresponding to two or more fetched index update records falling within said boundary values, and re-traversing said index based upon said next key value not falling within said two boundary values.

28. A computer readable medium of claim 27, further comprising the steps of;

storing two or more of said sorted plurality of index update records in an update buffer;

performing said plurality of index update operations from said two or more index update records stored in said update buffer to said index;

generating a single redo log record to describe said plurality of index update operations performed from said update buffer to said index.

\* \* \* \* \*